(No Model.)
C. HAYNER.
FLY SWITCHER FOR HORSES.
No. 492,287. Patented Feb. 21, 1893.
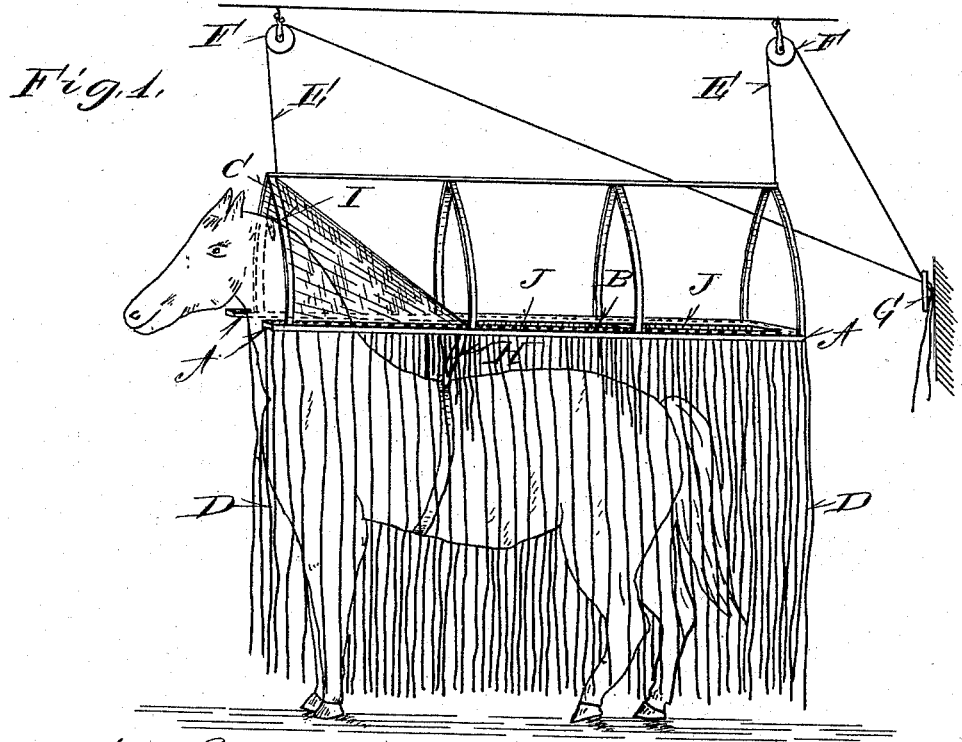
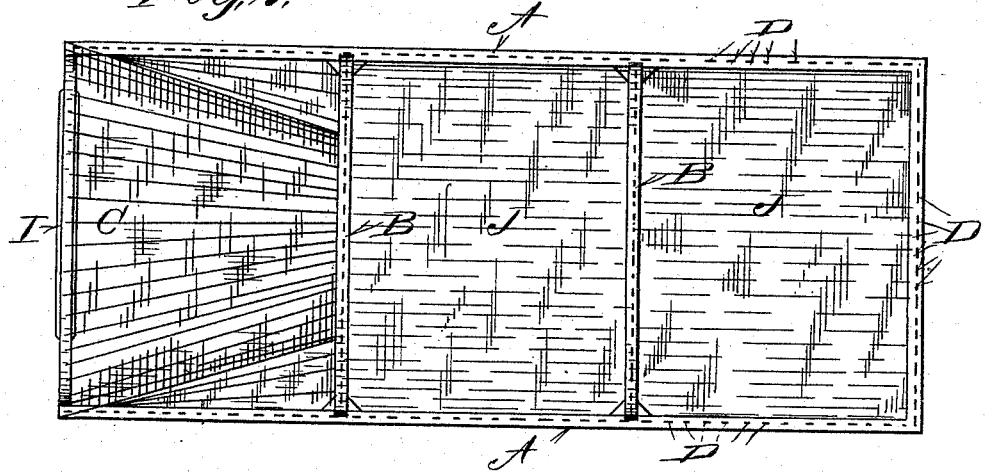
WITNESSES:
INVENTOR
Clark Hayner
BY
his ATTORNEY.

UNITED STATES PATENT OFFICE.

CLARK HAYNER, OF TROY, OHIO.

FLY-SWITCHER FOR HORSES.

SPECIFICATION forming part of Letters Patent No. 492,287, dated February 21, 1893.

Application filed March 31, 1892. Serial No. 427,145. (No model.)

*To all whom it may concern:*

Be it known that I, CLARK HAYNER, a citizen of the United States, residing at Troy, in the county of Miami and State of Ohio, have invented certain new and useful Improvements in Fly-Switchers, of which the following is a specification, reference being had therein to the accompanying drawings.

My invention relates to certain new and useful improvements in fly switchers.

The object of my invention is to provide means for switching flies and other insects from horses or other animals, by the movement of the animals themselves, the peculiarities of construction and operation of which will be hereinafter fully described and claimed.

In the accompanying drawings on which like reference letters indicate corresponding parts: Figure 1, represents a perspective view of my device applied to a horse; and Fig. 2, a plan view of the frame work.

The letter A represents a frame of rectangular, or other convenient shape, provided with cross-pieces B, and an upward extension or hood C. From this frame work are pendent a number of cords D, about two inches apart, and extending down around the horse, when in position as seen in Fig. 1. The cross pieces B, carry a series of cords which are of different lengths, being shorter in the middle of the frame, directly over the horse, and longer at the sides. The frame work is supported about six or eight inches from the back of the horse by cords or ropes E, extending over pulleys F, and downward to a suitable hook or clamp G. The frame may thus be raised or lowered according to the height of the horse. It may be otherwise supported, so long as it is adapted to be oscillated readily to produce a waving motion of the pendent cords. This oscillation of the frame may be effected by the horse himself, either by an elastic connection H, with the frame from the surcingle, or by a hand I, across the hood of the frame, which is struck by the neck of the horse with every slight movement of his head. It has been found by practical operation, that the horse will readily understand the use of the device and vibrate the frame whenever necessary. The cords being thus in continual wavy motion, prevent the lodgment of the flies upon the horse. For further protection to the back of the animal a light netting J, may be stretched across the frame work and carried up to form the hood C. The frame work being hung from the supporting pulleys F, may be readily raised to facilitate taking the horse from the stall, and adjusted to various heights, according to the size of the horse. The frame may also be readily moved in any direction.

The resulting advantage to the horse by the use of my device will be apparent to all. Even in the worst fly weather, it has been found that my device effectually prevents the biting and fretting of the horses by flies and like insects. The cords form sufficient protection by their waving motion to prevent the flies coming within the frame work, while they allow the exit of the flies which may enter during a temporary cessation of movement.

I am aware that switching devices and screens for flies and mosquitoes have been employed heretofore in bedrooms and for horses, but such devices have been operated by independent mechanism, or have been simply employed as screens about the body of the animal. My device, however, as herein shown and described in its application as a fly switcher for horses, is operated in its preferred form, by the voluntary and involuntary movements of the horse himself,—by the movement of the body through the elastic connection with the frame, and by the throwing up of the head, whereby the neck is engaged with the cross strap of the hood-like extension, to swing the frame-work and switch the cords.

Having thus fully described my invention, what I claim as new, and desire to secure by Letters Patent, is—

1. As an improvement in switchers, a horse-operated fly switcher, consisting of a rigid rectangular screened frame, cords pendent from the outside of said frame inclosing the horse, a hoop spanning the frame from side to side at one end thereof, and a screen from said hoop backward to form a hood-like extension, a cross strap in said hood adapted to be engaged by the neck of the horse, and adjustable swinging supports for said frame to allow the oscillation of the frame and the switching of the cords by the movement of the horse's neck.

2. A horse-operated fly switcher, consisting of a swinging adjustable screened frame having a hood-like extension for the neck of the horse, cords pendent from the sides and cross bars of said frame, ropes adjustably supporting said frame, a cross strap at one end near the horse's neck and an elastic connection adapted to be connected with the body of the horse, whereby the frame and cords may be moved with every movement of the neck or body of the horse.

In testimony whereof I affix my signature in presence of two witnesses.

CLARK HAYNER.

Witnesses:
SHERMAN T. MCPHERSON,
W. J. CLYDE.